United States Patent [19]

Meinke

[11] 4,193,123
[45] Mar. 11, 1980

[54] FAULT DETECTION IN DATA RATE CONVERSION SYSTEMS USING A FIRST-IN, FIRST-OUT BUFFER

[75] Inventor: James M. Meinke, Lisle, Ill.

[73] Assignee: Bell Telephone Laboratories, Incorporated, Murray Hill, N.J.

[21] Appl. No.: 888,345

[22] Filed: Mar. 20, 1978

[51] Int. Cl.² ........................................... G06F 11/00
[52] U.S. Cl. .................................................. 364/900
[58] Field of Search ... 364/200 MS File, 900 MS File; 179/15 AE, 15 AV, 15 BV

[56] References Cited

U.S. PATENT DOCUMENTS

| | | | |
|---|---|---|---|
| 3,292,156 | 12/1966 | Stochel | 364/900 |
| 3,348,209 | 10/1967 | Brooks | 364/900 |
| 4,062,059 | 12/1977 | Suzuki et al. | 364/900 |

*Primary Examiner*—Leo H. Boudreau
*Attorney, Agent, or Firm*—Peter Visserman

[57] ABSTRACT

A fault detection arrangement for a data rate conversion system is disclosed. In accordance with the embodiment one forty-bit digital word representing a speech segment is transmitted from a digital word source to a first-in, first-out (FIFO) buffer every 1.28 milliseconds at a 1 megahertz per second bit rate. The bits are read from the FIFO at a 31.25 kilobit per second rate and applied to a digital-to-analog converter. The FIFO contains at least thirty-nine bit storage positions and by design no bit is read from the FIFO until a predetermined period of time after a first bit has been written therein. FIFO empty fault signals are generated if the FIFO ever becomes empty and FIFO fault signals are generated if the FIFO ever becomes full.

6 Claims, 2 Drawing Figures

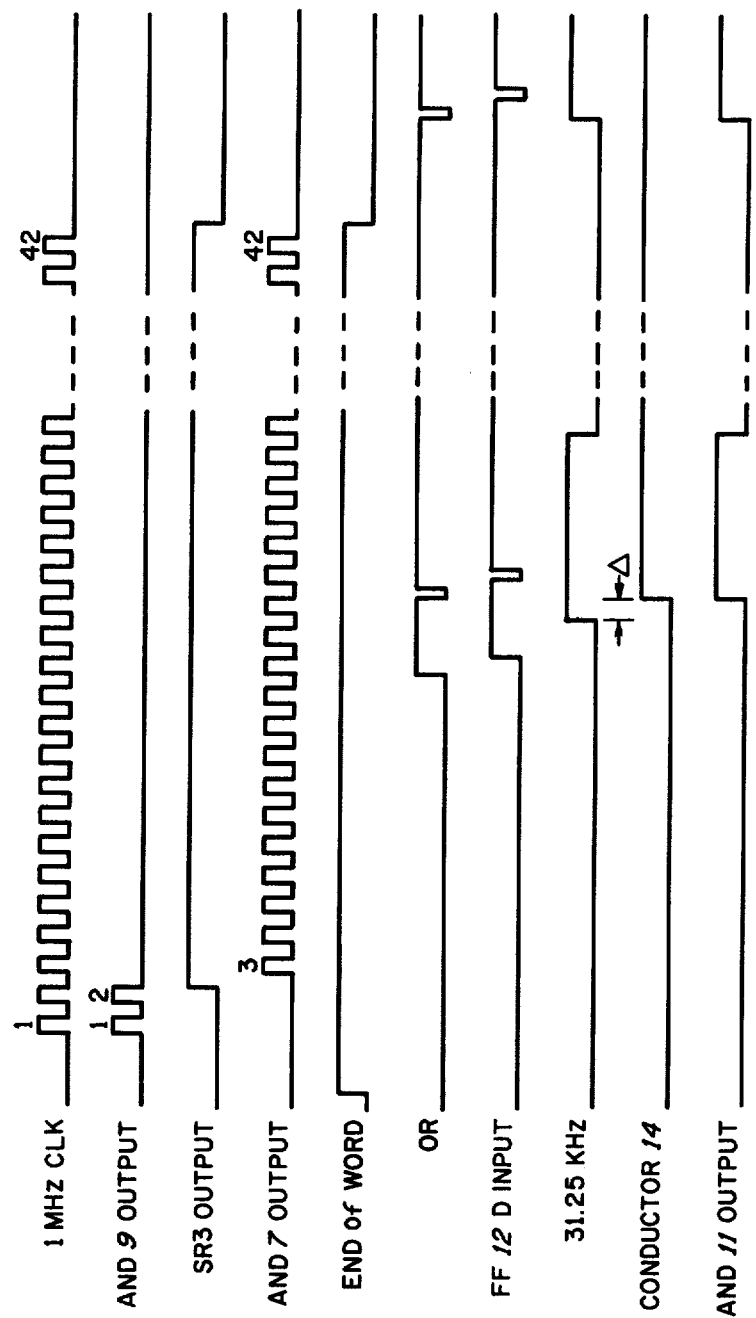

FAULT DETECTION IN DATA RATE CONVERSION SYSTEMS USING A FIRST-IN, FIRST-OUT BUFFER

FIELD OF THE INVENTION

The present invention relates to fault detection systems and more particularly to such systems for use in data rate conversion arrangements.

BACKGROUND OF THE INVENTION

In the digital communication field, data rate converters are frequently used to provide an interface between arrangements which must intercommunicate but which operate at different rates. Digital-to-analog converters often require such data rate conversion between a digital information source and the actual digital-to-analog converter. In such systems, faults are normally located by surveying the individual components e.g., timing circuits, read-write circuits which make up the entire system. The result of such a fault location technique is a relatively large number of separate fault location circuits and a complex arrangement for obtaining the information with regard to a given fault. By utilizing a first-in, first-out (FIFO) buffer arrangement constructed in accordance with the present invention the number of locations surveyed for faults is reduced, and accordingly, the arrangement for obtaining fault information is much less complex.

SUMMARY OF THE INVENTION

A fault detection arrangement in accordance with the present invention comprises a data word source which generates n bit data words at the rate of one such data word every m microseconds, a first-in, first-out buffer (FIFO) for storing the data words which includes means for generating output ready signals indicating the FIFO to be empty or not empty, a clock pulse generator for generating a continuous sequence of clock pulses at the rate of one clock pulse every m/n microseconds. The output ready signals are sampled in response to each clock pulse and, if the output ready signal indicates that the FIFO is not empty, one digit is read from the FIFO a predetermined period of time ($\Delta$) after the sample is taken. If, after an initialization period, the FIFO is found to be empty when the output ready signal is sampled, a FIFO-empty fault signal is generated.

In accordance with another aspect of the present invention, the FIFO should further comprise a FIFO input ready signal generating means for indicating the FIFO to be full or not full and the FIFO should contain at least a number of bit positions defined by the following equation:

minimum number of bit positions $= n - q + 1$ where
$q =$ the integer quotient of $T - \Delta/(m/n)$
$T =$ total time to write a data word into the FIFO and
$\Delta =$ time between sampling output ready and the next bit read.

When operating as above described, a FIFO-full indication by the input ready signal will also indicate a fault in the circuit operation.

In accordance with one embodiment of the present invention, the fault detection arrangement comprises a first-in, first-out buffer having 64 serial bit storage locations, one 40-bit digital data word representing a speech segment portion is transmitted to the first-in, first-out buffer every 1.28 milliseconds at a one megabit per second bit rate. Bits are read from the FIFO at a 31.25 kilobit per second rate in response to a 31.25 Khz clock signal and applied to a digital-to-analog converter. When operating in accordance with this embodiment, the FIFO, during fault free operation, will always contain between one and thirty-nine bits when the output ready signal is sampled. Accordingly, a fault is indicated anytime the FIFO becomes full or anytime the FIFO is empty when the output ready signal is sampled.

BRIEF DESCRIPTION OF THE DRAWING

The invention will be more clearly understood by the reading of the following description in conjunction with the drawing in which:

FIG. 2 is a timing diagram helpful in the understanding of FIG. 1.

DESCRIPTION

Figure 1:
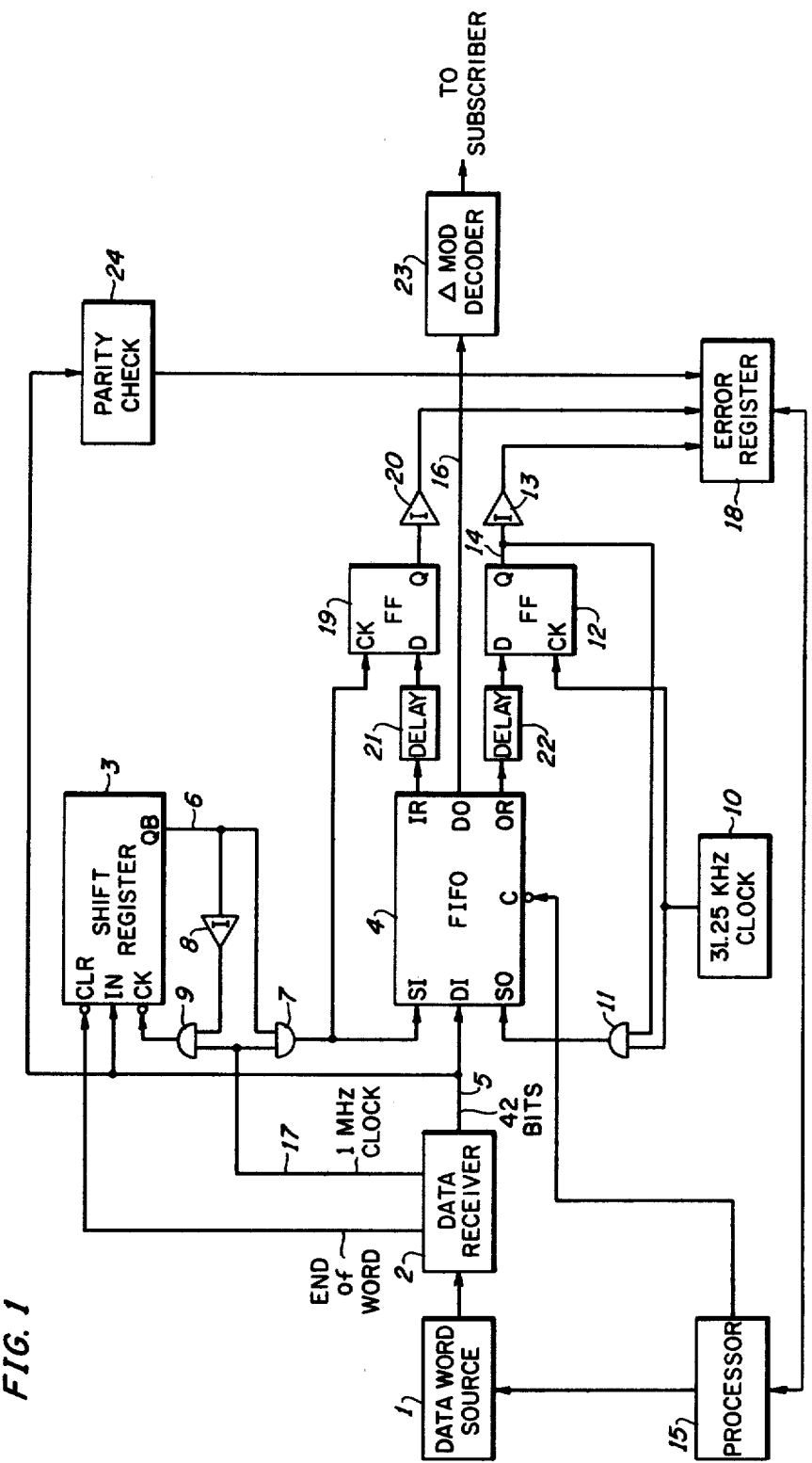
FIG. 1 is a block diagram of an embodiment of the present invention.

The embodiment of the present invention shown in FIG. 1 includes a data word source 1 which serially transmits digital data words to a data word receiver 2. The transmission of such data words is controlled in part by signals from a central processor 15. Each data word transmitted by data word source 1 comprises, in sequence, six header bits, a logical "1", an error check bit and a forty-bit word representing speech. The forty-bit speech representing word is referred to herein as a "speech" word. Data words are transmitted from data word source 1 at the rate of one data word every 1.28 milliseconds and at a bit rate of one megabit per second. A data word source of the above-mentioned type and its interaction with a central processor is disclosed in detail in U.S. Pat. No. R. M. Dudonis, 4,031,324, issued June 21, 1977.

Data word receiver 2 removes the six header bits from the data word, generates a 1-megahertz clock signal in synchronism with the bits of the incoming data word, and generates an end of data word signal when no data word is being received. The use of the header word and its removal are not related to the present embodiment. They are described, however, in the above-mentioned R. M. Dudonis patent. The data word receiver 2 serially transmits the remaining forty-two bits of the data word at the one megabit per second rate, to the input terminals of a shift register 3 and a first-in, first-out buffer (FIFO) 4 via conductor 5. The one megahertz clock signals generated by data word receiver 2 are transmitted on conductor 17. The one megahertz clock signals consist of forty-two pulses at the one megahertz rate (FIG. 2) where each pulse is associated in time with one of the forty-two bits transmitted on conductor 5.

FIFO 4 is used to buffer the forty-bit speech word before it is transmitted to a delta modulation decoder 23 for conversion to analog form. In the present embodiment FIFO 4 is a sixty-four bit serial first-in, first-out buffer which can be, for example, the Advanced Microdevices Product AM2841. When the AM2841 device is used, only one of the data input terminals and its associated output terminals are utilized. The remaining three input terminals and three output terminals can be connected to ground. It should be noted that the length of sixty-four storage locations is not critical provided that the number of bit storage locations in the FIFO is equal to or exceeds the minimum number required, as will be described in detail later herein.

A bit applied to the input terminal DI of FIFO 4 is gated into the FIFO in response to the rising edge of a pulse applied to the shift input terminal SI. A bit gated into the FIFO is automatically shifted to the output storage position of the FIFO approximately 10 microseconds after being gated in. It should be noted that the approximately 10 microsecond period for shifting a bit from the FIFO input to the output storage position is not critical provided that the bits are shifted from one storage position to the next at a rate of at least 1 megahertz. Each successive bit gated into FIFO 4 is automatically shifted to the last unoccupied bit storage position of the FIFO. Bits are read from FIFO 4 from terminal DO in response to the rising edges of pulses applied to the shift-out terminal SO. When the output bit is read from FIFO 4, all other bits shift one position toward the output bit storage position.

FIFO 4 generates an input ready signal at terminal IR when at least one of the bit storage positions internal to the FIFO is available. The input ready signal, when indeed storage positions are available, is predominately a logical "1". Each time a shift-in pulse is applied to shift input terminal SI, however, the input ready signal briefly becomes a logical "0" then returns to a logical "1". FIFO 4 also generates an output ready signal at terminal OR when a valid bit (either a logical "0" or a logical "1") is stored in the output storage position. When such a valid bit exists in the output storage position, the output ready signal at terminal OR is predominately a logical "1". However, each time a shift-out pulse is applied to terminal SO, the output ready signal briefly becomes a logical "0". FIFO 4 further includes a clear input terminal C, the use of which will be discussed below.

The shift register 3 is used to control the pulses applied to the shift input terminal SI of FIFO 4 so that the first two bits of the data words, i.e., the leading "1" and the error check bit are not gated into the FIFO. Shift register 3 is a two-stage shift register which responds to the negative edge of a pulse at its terminal CK by storing the quantity present at its input terminal IN in its first stage and shifting the contents of the first stage to the second stage. A representation of the quantity stored by the second stage is transmitted from shift register 3 on a conductor 6. Conductor 6 is connected directly to an AND gate 7 and, via an inverter 8, to an AND gate 9. The output of AND gate 7 is connected to the shift input terminal SI of FIFO 4 and the output of AND gate 9 is connected to the terminal CK of shift register 3. The series of 1-megahertz clock pulses extracted from the incoming data word by data word receiver 2 is applied as a second input to both AND gates 7 and 9. In accordance with the above, a logical "0" on conductor 6 will gate the 1-megahertz clock signals on conductor 17 to the CK input of shift register 3 and inhibit their transmission to the FIFO 4. Alternatively, a logical "1" on conductor 6 will gate the 1-megahertz clock signals to the shift input terminal SI of FIFO 4 and inhibit their application to shift register 3.

Between data words, shift register 3 is cleared to store a logical "0" in both of its stages by the previously mentioned end-of-word signal (FIG. 2) from data word receiver 2. The end-of-word signal is removed when the first bit of a data word is received by data word receiver 2. Accordingly, when the first bit of a data word is received by data word receiver 2, shift register 3 stores logical "0s" in both stages and therefore applies a logical "0" to conductor 6. This logical "0", via inverter 8, enables AND gate 9 to pass the first 1-megahertz clock pulse (FIG. 2) to the terminal CK of shift register 3. Shift register 3 in response to the pulse at its terminal CK stores the leading one of the data word on conductor 5 in its first stage and shifts the logical "0" previously stored by the first stage to the second stage. This logical "0" in the second stage enables AND gate 9 to pass the second 1-megahertz clock pulse (FIG. 2) from data word receiver 2 to the input CK of shift register 3. In response to the second pulse, shift register 3 stores the error check bit, which is then present on conductor 5, in the first stage of shift register 3 and shifts the leading "1" in the first stage to the second stage. The logical "1" in the second stage inhibits AND gate 9 from transmitting further clock pulses to shift register 3 and enables AND gate 7 to transmit the remaining forty 1-megahertz pulses (FIG. 2) to the shift input terminal SI of FIFO 4. As each successive pulse occurs at shift input terminal SI, the associated data bit on conductor 5 is gated into FIFO 4. After the last bit is transmitted on conductor 5, the 1-megahertz clock pulses stop and the end-of-word signal is transmitted to shift register 3 by data word receiver 2. In response to end-of-word signal, shift register 3 clears both of its stages to logical "0s", thus preparing itself for the next data word.

The embodiment of FIG. 1 further includes a 31.25 kilohertz clock circuit 10 which generates a continuous series of pulses at a 31.25 kilohertz rate (FIG. 2). The 31.25 kilohertz clock pulses are transmitted from clock circuit 10 to an AND gate 11 and to the CK input of a D flip-flop 12. The D input of flip-flop 12 is connected, by a delay circuit 22, to receive the output ready signals from terminal OR of FIFO 4. The D flip-flops employed in the present embodiment function in accordance with well-known principles to store the value present at their D input in response to the rising edge of a pulse at their CK input. A signal representing the value stored by flip-flop 12 is transmitted on a conductor 14 a predetermined period of time after the pulse is received at terminal CK. The signal on conductor 14 is applied to AND gate 11 and an inverter 13. The output of AND gate 11 is connected to input terminal SO of FIFO 4.

The signal from FIFO 4 at terminal OR is a logical "0" when no digit is present in its output storage position. Alternatively, it is a logical "1" when a digit is stored in the output storage position. When the arrangement of FIG. 1 is first initialized, a clear signal is transmitted from the central processor 15 to clear all bit positions in the FIFO 4 which defines the output at the terminal OR to be a logical "0". In response to pulses from clock circuit 10, the logical "0" from terminal OR is stored in flip-flop 12 and transmitted thereby to AND gate 11 via conductor 14. The logical "0" on conductor 14 inhibits AND gate 11 from transmitting pulses from clock circuit 10 to the terminal SO of FIFO 4. Thus, no bits are read from FIFO 4. When a first bit is gated into FIFO 4 as described above, it is automatically shifted through the FIFO in approximately ten microseconds. At the end of this 10-microsecond period, a logical "1" is transmitted from terminal OR, indicating a bit is present in the output storage position of FIFO 4. The logical "1" from the terminal OR is transmitted via delay circuit 22 to flip-flop 12 which stores it at the rising edge of the next occurring 31.25 kilohertz clock pulse. After storage in flip-flop 12 this logical "1" is transmitted to AND gate 11 via conductor 14. The logical "1" on conductor 14 enables AND gate 11 to transmit the 31.25 kilohertz clock pulses to the terminal SO of FIFO 4. FIFO 4, as above described, responds to each pulse from clock circuit 10 at its terminal SO by gating the bit stored in the output storage position of FIFO 4 onto conductor 16 whereby it is applied to delta modulation decoder 23. When operating in accordance with the above description, there will always be at least one bit in FIFO 4 before any attempt is made to read bits therefrom.

As previously indicated, the output of FIFO 4 on terminal OR briefly becomes a logical "0" each time a bit is read from the FIFO. Since the same 31.25 kilohertz clock pulse leading edge starts a FIF0-read operation and controls the storage by flip-flop 12 it is possible that flip-flop 12 could store a transient logical "0" from terminal OR. Accordingly, delay circuit 22 is employed to briefly delay the transmission of signals from the terminal OR to flip-flop 12 so that the rising edge of each 31.25 kilohertz clock pulse will be passed before a transient logical "0" from terminal OR is received by flip-flop 12. It has been found that the delay interval of delay circuit 22 can be reduced to zero when the previously mentioned AM2841 device is used, due to inherent delays in the device.

As described above, speech words comprising 40 bits each are written into FIFO 4 at the rate of one speech word per 1.28 milliseconds, and the bits of a speech word are entered at the rate of one bit per microsecond. Further, bits are read from FIFO 4 at a 31.25 kilobit per second rate. This reading rate dictates that 40 bits will be read from FIFO 4 every 1.28 milliseconds. It will be noted that this is the same bit rate as the average rate at which bits are written into FIFO 4. Since, in accordance with the present invention, no bit is read from FIFO 4 until at least one bit is written in, FIFO 4 under normal operation will always contain at least one bit when signal OR is sampled by the 31.25 kilohertz clock signal. Accordingly, a logical "0" signal stored by flip-flop 12 after the above-mentioned initialization period will indicate a system fault regarding the FIFO 4 or its control circuitry. For this reason, the quantity stored by flip-flop 12 is inverted and applied to an error register 18 in a bit position associated therewith. In accordance with principles well-known in the art, central processor 15 periodically interrogates the error register to determine if any logical "1s" are present therein. If such logical "1s" are present, central processor 15 will begin diagnosing the circuit of this embodiment to determine the exact cause of such an error signal. Error register 18 also includes a bit position associated with errors occurring in the speech word as transmitted from the data word receiver 2 on conductor 5. An error code parity check circuit 24 is connected to conductor 5 and receives both the 40-bit speech word and the error check digit. If parity check circuit 24 determines, in a manner well-known in the art, that a speech word error has occurred, a logical "1" is transmitted to the associated bit position in error register 18.

During the initialization period for the present embodiment, central processor 15 clears the entire FIFO as above described. This will result in a logical "0" output at terminal OR of FIFO 4. This logical "0" at terminal OR will in turn result in a logical "1" being stored in error register 18, indicating a FIFO-empty fault. Central processor 15 ignores FIFO fault signals during the initialization period to avoid taking action on this type of spurious fault signal. This can be implemented either at the central processor or by masking the logical "1" in error register 18 in accordance with principles well-known in the art.

The embodiment of FIG. 1 further includes a D flip-flop 19. The D input of flip-flop 19 is connected via a delay circuit 21 to the terminal IR of FIFO 4 and the CK input of flip-flop 19 is connected to the output of AND gate 7. It will be remembered that the output of AND gate 7 consists of forty 1-megahertz clock pulses in association with each incoming data word. In response to each pulse received at the input CK, D flip-flop 19 samples and stores the signal at the output of delay circuit 21. It will be remembered that a logical "1" should be present at terminal IR so long as an unoccupied storage position remains in FIFO 4. Since FIFO 4 should never, in normal operation, contain sixty-four digits the IR terminal should never be in the logical "0" state except for certain later described transient conditions. The output of flip-flop 19 is inverted by an inverter 20 and transmitted to the error register 18. Accordingly, if flip-flop 19 ever stores a logical "0", a logical "1" will be transmitted to error register 18 in a position associated with a FIFO full fault. Central processor 15 responds as previously described to such a fault indication by performing diagnostic routines to locate possible FIFO read circuitry faults.

Delay circuit 21 is utilized to briefly delay the signals transmitted from terminal IR of FIFO 4 to the D input of flip-flop 19. This delay is employed so that one of the above described transitory logical "0" states of terminal IR will not be sampled and stored in flip-flop 19. When the AM2841 device is used as FIFO 4, it has been determined that the delay interval provided by the delay circuit 21 can be reduced to zero, due to inherent delays in the device.

The minimum number of storage locations in FIFO 4 should equal the maximum number of bits expected to be stored in the buffer plus one. The additional one storage location is used so that the FIFO is never full during normal operation. The maximum number of bits to be stored in the buffer is equal to the number of bits in each data word minus the least number of bits which can be read from the FIFO during the time (T) that a data word is being written into the FIFO. In accordance with the present embodiment, no bits are read until a predetermined period of time ($\Delta$) has passed after a bit is stored in the output bit position of the FIFO. Accordingly, the least number of bits which can be read from FIFO 4 during the time that a data word is being written into it is the number of bits which can be read the time interval $T - \Delta$. This number of bits is calculated by dividing the time period $T - \Delta$ by the time it takes to read a bit ($m/n$). Only the quotient of this division is used since no fractional read operations can be performed. In accordance with the above, the minimum number of storage locations in FIFO 4 is given by the following equation:

minimum number of bit positions $= n - q + 1$ where $q$ = the integer quotient of $T - \Delta/(m/n)$ $T$ = total time to write a data word into the FIFO and $\Delta$ = time between sampling output ready and the next bit read.

I claim:

1. A fault detection arrangement comprising:
a digital word source for generating n bit digital words at the rate of one such digital word every m microseconds;
a first-in, first-out buffer comprising means responsive to the storage condition of said first-in, first-out buffer for generating buffer-empty signals and alternatively buffer-not-empty signals;

means for storing digital words from said digital word source in said first-in, first-out buffer at the rate of one digital word every m microseconds;

means responsive to said buffer-not-empty signals for reading bits from said first-in, first-out buffer memory at the rate of one bit per m/n microseconds, said means for reading being activated a predetermined period of time after at least one bit has been stored in said first-in, first-out buffer; and means responsive to said buffer empty signals for generating fault signals.

2. The combination in accordance with claim 1 further comprising:

clock pulse generating means for generating a continuous sequence of clock pulses at the rate of one pulse per m/n microseconds;

enabling means, connected to said first-in, first-out buffer and responsive to said clock pulses and to said buffer-not-empty signals for generating read-enable signals; and wherein said means for reading bits from said first-in, first-out buffer is responsive to said read-enable signals and said clock pulses.

3. The combination in accordance with claim 2 wherein said enabling means generates said read enable signals said predetermined period of time after the first coincidence of one of said clock pulses and said buffer-not-empty signals.

4. A fault detection arrangement comprising:

digital word source for generating n bit digital words at the rate of one such digital word every m microseconds;

clock pulse generating means for generating a continuous sequence of clock pulses at the rate of one clock pulse per m/n microseconds;

a first-in, first-out buffer comprising means responsive to the storage condition of said first-in, first-out buffer for alternatively generating buffer-empty and buffer-not-empty signals;

means for storing digital words from said digital word source in said first-in, first-out buffer at the rate of one digital word every m microseconds, each digital word being written into said first-in, first-out buffer in T microseconds;

enabling means, responsive to said clock pulses and said buffer-not-empty signals, for generating a read-enable signal a predetermined period of time, $\Delta$ microseconds, after the first coincidence of one of said clock pulses and said buffer-not-empty signal;

means responsive to said read-enable signal and said clock signals for reading bits from said first-in, first-out buffer at the rate of one bit per m/n microseconds.

means responsive to said buffer-empty signals for generating fault signals; and wherein said first-in, first-out buffer comprises at least the number of storage locations defined by $n-q+1$ where q equals the integer quotient of $T-\Delta/(m/n)$.

5. The combination in accordance with claim 4 further comprising a full buffer indicating means responsive to the contents of said first-in, first-out buffer for generating a buffer-full signal when no unoccupied storage locations exist in said first-in, first-out buffer; and means responsive to said buffer-full signals for generating fault signals.

6. A digital-to-analog conversion arrangement comprising:

a digital word source for generating n bit digital words at the rate of one such digital word every m microseconds;

a first-in, first-out buffer having storage locations for storing said digital words comprising status signal generating means responsive to the contents of said first-in, first-out buffer for generating a buffer full signal when no unoccupied storage locations exist in said first-in, first-out buffer, for generating buffer empty signals when no storage locations in said first-in, first-out buffer are storing a bit and for generating buffer-not-empty signals when said first-in, first-out buffer is storing at least one bit;

means for serially transmitting data words from said digital word source to said first-in, first-out buffer;

means responsive to said transmitting means for generating a sequence of gating pulses at a rate faster than one gating pulse per m/n microseconds;

means responsive to said gating pulses for gating the bits of said digital words into said first-in, first-out buffer, the bits of one of said digital words being gated into said first-in, first-out buffer in T microseconds;

a clock pulse generating means for generating a continuous sequence of clock pulses at the rate of one clock pulse per m/n microseconds;

enabling means responsive to said clock signals and said buffer-not-empty signals for generating a read-enable signal a predetermined period of time, $\Delta$ microseconds, after the first coincidence of one of said clock pulses and said buffer-not-empty signal;

a digital-to-analog decoder;

means responsive to said read-enable signal and said clock signals for reading bits from said first-in, first-out buffer at the rate of one bit per m/n microseconds and for transmitting bits read from said first-in, first-out buffer to said digital-to-analog converter; and means responsive to said buffer-full signal and buffer-empty signal for generating fault signals, and wherein said first-in, first-out buffer comprises at least the number of storage locations defined by $n-q+1$ where q equals the integer quotient of $T-\Delta/(m/n)$.

* * * * *